Figure 1:
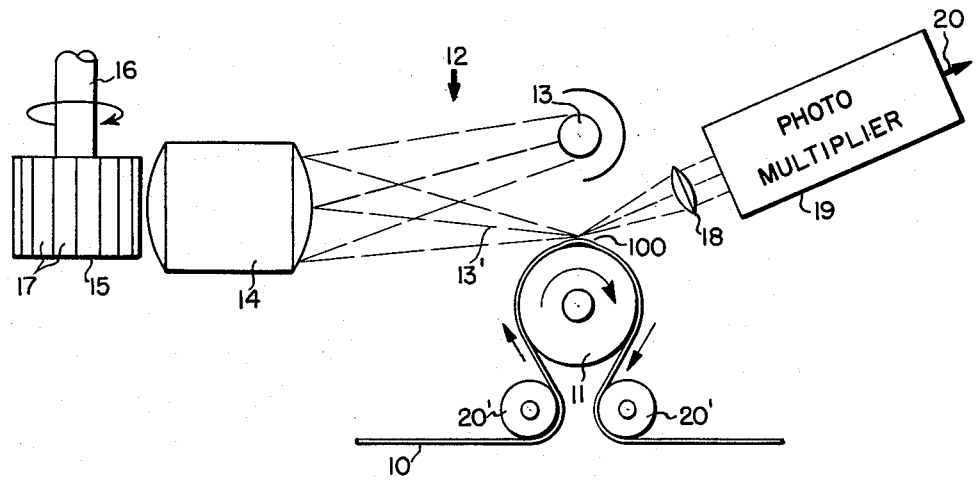

March 17, 1964  H. G. WARREN ETAL  3,125,265
METHOD AND APPARATUS FOR SCANNING THE SURFACE OF A MOVING WEB
Filed May 1, 1961  2 Sheets-Sheet 1

HORACE G. WARREN
WELTON O. MYERS
INVENTORS

BY
ATTORNEYS

HORACE G. WARREN
WELTON O. MYERS
INVENTORS

BY

ATTORNEYS

United States Patent Office 3,125,265
Patented Mar. 17, 1964

3,125,265
METHOD AND APPARATUS FOR SCANNING THE SURFACE OF A MOVING WEB
Horace G. Warren and Welton O. Myers, both of Rochester, N.Y., assignors to Eastman Kodak Company, Rochester, N.Y., a corporation of New Jersey
Filed May 1, 1961, Ser. No. 106,860
8 Claims. (Cl. 226—1)

The present invention relates to continuously optically scanning the surface of a moving web, and particularly to a method and apparatus by the use of which that portion of the web passing the point of scan is removed from, and yieldably supported out of, physical contact with a guiding surface which serves to guide the web to, past, and from said scanning point.

It is well known in the art to inspect the surface of a web for imperfections by guiding the web over a roller or other moving support and past a scanning point where it is illuminated by a beam of light directed onto the web surface at a grazing incidence and optically and/or electro-optically measuring the reflectance of the light from the surface to determine the presence of imperfections in the surface. Such a system of continuous inspection is shown in U.S. Patent 2,719,235. While such inspection systems have proved very useful we have found that they often present certain problems which may fail to show up critical defects in the web surface or may indicate the presence of defects which are not actually there. For example, when a web is scanned while being drawn tightly over a roller, any dirt or foreign particles which might inadvertently get onto the surface of the roll beneath the web could cause a bulge in the web surface which the scanner might pick up as a surface defect. Likewise, any imperfection in the roller surface might give the same false indication. On the other hand, any undersirable wrinkle or crease which is actually in the web might be straightened out as the web is stretched over the supporting roll at the scanning point and would not appear as a defect during the scanning operation. In addition, in such known scanning systems it has been customary to drive the scanning roll and elaborate means have been used in an attempt to drive this roll at the same speed as the web is moving in an effort to prevent relative movement between the web and the roll.

Therefore, the primary object of the present invention is to provide a method for scanning or inspecting a web of the type set forth above which overcomes the mentioned shortcomings or disadvantages occasioned by the use of scanning rolls normally used in known scanning methods and apparatus.

Another object is to provide web scanning apparatus including a web guiding and supporting means which will physically support the web while it is being guided thereby over most of a given path but which will cause and/or allow the web to be disengaged from physical contact therewith while moving over an intermediate portion of said path.

And yet another object is to provide a web guiding and supporting means for a scanning apparatus in which the web is driven and the guiding and supporting means is freely rotatable and has the web held in surface contact therewith so as to be driven by the web whereby there is no problem of synchronizing the movement of the web and the guiding means.

A further object is to provide a web guiding and supporting means for a scanning apparatus comprising an endless porous guiding member into contact with one surface of which one face of the web is brought to be guided over a given path and including means for forcing said web out of contact with said guiding member as it moves over an intermediate portion of said path at which said web is scanned along with means for forcing said web into surface contact and driving relation with said guiding member over lengths of said path approaching and leaving said intermediate portion.

And another object of the present invention is to provide a web guiding and supporting means which comprises a porous shell supported at its opposite ends on air bearings for frictionless rotation and about which shell a web is wrapped to be supported and guided thereby, said shell provided with means for applying a vacuum to certain portions thereof to hold the web in contact therewith and provided with means for blowing the web out of contact with another portion of the shell so as to form a 'bubble" in the web as it moves past a given point in its path of movement while wrapped around the shell.

The novel features that we consider characteristic of our invention are set forth with particularity in the appended claims. The invention itself, however, both as to its organization and its methods of operation, together with additional objects and advantages thereof will best be understood from the following description when read in connection with the accompanying drawings in which:

FIG. 1 is a diagrammatic showing of our web guiding and supporting means used as a scanning roll in combination with an electro-optical web scanner.

Figure 2:
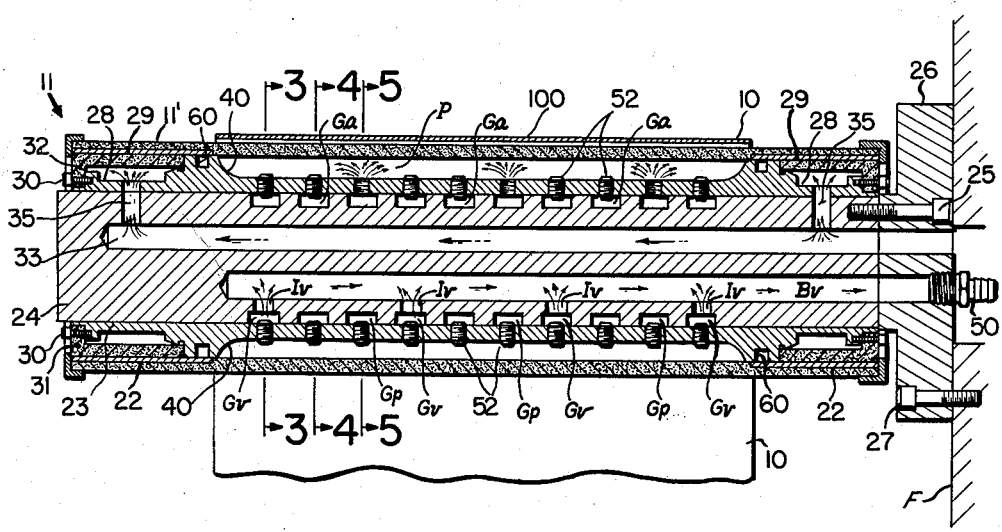
Figure 3:
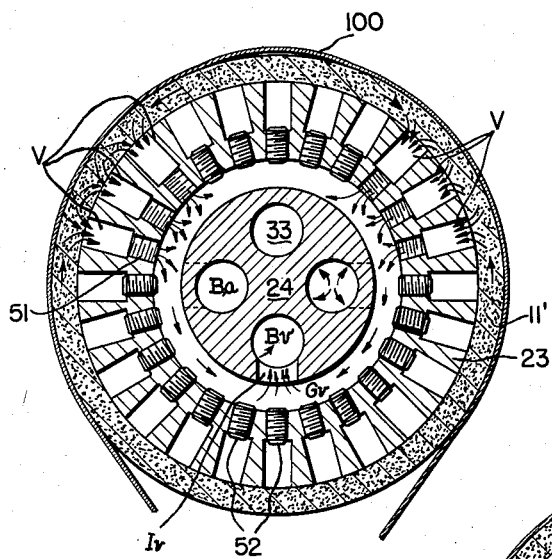
Figure 4:
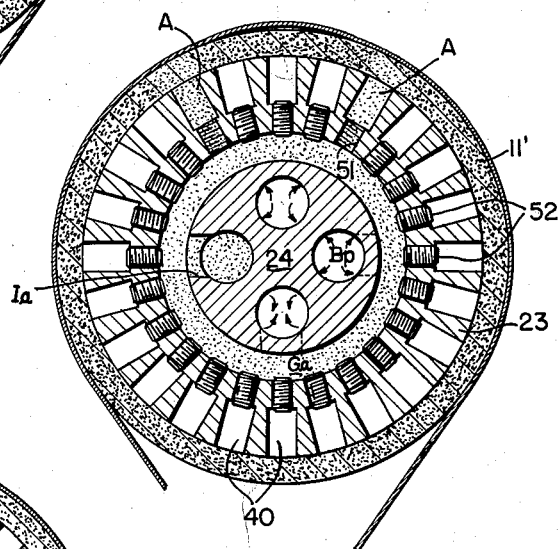
Figure 5:
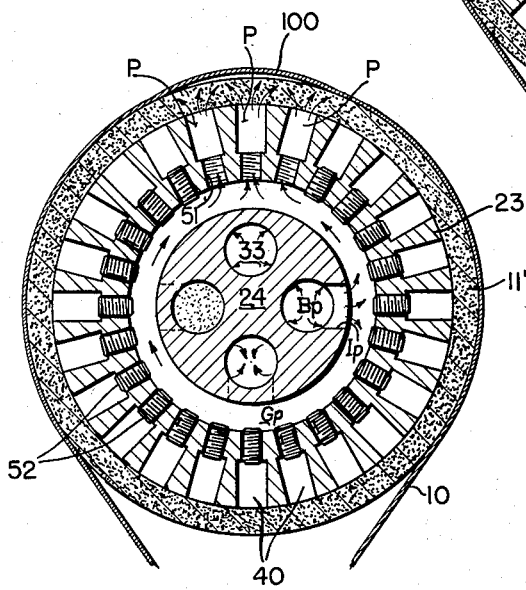

FIG. 2 is a longitudinal sectional view of the present web guiding and supporting means, FIG. 3 is an enlarged sectional view taken substantially on line 3—3 of FIG. 2, and showing the porting for the vacuum chambers which serve to hold the web on the surface of the shell, FIG. 4 is an enlarged sectional view taken substantially on line 4—4 of FIG. 2, and showing the porting for the ambient pressure chambers, and FIG. 5 is an enlarged sectional view taken substantially on line 5—5 of FIG. 2 and showing the porting for the low pressure chambers for forming the "bubble" in the web at the scanning point.

While the web guiding and supporting means constituting the present invention may be other applications, for purposes of illustration we have chosen to show it in the form of a roll or shell and used as the scanning roll in combination with a web inspection device which may be of the type shown in U.S. Patent 2,719,235.

As shown in FIG. 1 of the drawings, a film or web 10, the surface of which is to be inspected for defects or flaws, moves over a roll 11 at the inspection or scanning station. Located at the scanning station adjacent roll 11 is a scanner 12 arranged to cyclically sweep a beam of light 13' across the width of the web as it traverses the roll 11. The scanner is arranged so that light from a source 13 is directed through a suitable lens assembly 14 onto the surface of a polygonal mirror drum 15 rotatably driven by a suitable shaft 16. Each face or facet 17 of the drum will, as it rotates past the lens systems 14, reflect light from the source back through the lens 14 by which it will be focused into a relatively small scanning spot impinging on the surface of the web 10 as it traverses the roll 11. Due to the rotation of the mirror drum 15 each facet will, therefore, sweep a scanning spot or beam across the web 10, the optical system being so arranged and the number and the rate of movement of the facets being so correlated to the rate of movement of the web that substantially the entire surface of the web 10 will be scanned by a continuing succession of scanning sweeps. The light reflected from the surface of the web is then passed through a suitable lens 18 to a photomultiplier tube or other detector 19 so that there will appear at its output 20 a scanner output signal the value of which will at any time correspond to the reflectivity of the portion of the web surface being scanned at that particular instant. As is well known, the scanner output signal may be fed into any type of operating unit, not shown here but which may be of the type shown in U.S. Patent 2,719,235 or copending patent application Serial No. 768,350, filed October 20, 1958 in the names of A. E. Lake, Jr. and E. C. Yeaton, now Patent No. 3,026,415, for producing a flaw indicating signal in response to any predetermined variation in the scanning signal from a reference level. This flaw indicating signal may be used to operate a simple recorder, a counter, a device for marking the area of the web which is found defective, or it may be a more involved arrangement for sorting the web after it is chopped into standard lengths.

In the noted prior art scanning devices the scanning roll was driven and had the web wrapped tightly around its surface at the point where it passed the scanning beam. This arrangement gave rise to several disadvantages which the present invention is designed to overcome. One of these disadvantages was that any dirt particle which might become lodged between the surface of the scanning roll and the web might tend to deform the web in such a way that it would be picked up as a surface flaw by the scanner. Another disadvantage was that since the web is stretched about the drum surface at the point of scan, a wrinkle or crease in the web which should appear as a flaw could possibly have been straightened out as it passed the scan point and the flaw wouldn't be detected. And, where the scanning roll was driven, elaborate means were required in an attempt to maintain the speed of the roll the same as the linear speed of the web so that no relative motion occurred between the two.

The present invention relates to an improved web supporting and guiding means which can be used as a scanning roll in prior art scanners and overcome the disadvantages and shortcomings of known scanning rolls. To this end, the present web supporting and guiding means includes an idler roll or shell mounted on frictionless air bearings which is driven by the moving web having approximately a 270°–300° wrap therearound. The roll comprises a porous shell which rotates about a stator sleeve which is provided with a plurality of chambers extending longitudinally of the outside periphery of the sleeve and spaced from one another circumferentially thereof. Means are provided for introducing air under pressure into certain of said recesses, applying vacuum to others of said recesses, while certain recesses may be connected to the atmosphere or ambient pressure. The air under pressure is fed into the recess or recesses disposed substantially radially of the scanning point on the roll and the air passing through the porous shell serves to lift the web from the roll surface and support it in the form of a "bubble," as shown at 100, as it passes the scanning point. This lifting of the web from the surface of the roll at the scan point overcomes at least two disadvantages of prior art scanning rolls. First, it prevents any foreign matter which might be entrained between the web and roll surface, or any defect in the roll surface, from deforming the web as it passes the scan point and permitting such a deformation to be indicated as a flaw by the scanner. Secondly, by relieving the web from contact with the roll surface at the scanning point any crease or wrinkle in the web can appear and be picked up as a defect by the scanner. Those recesses in the stator sleeve on either side of the high pressure recesses are connected to a vacuum so that as the roll approaches and leaves the scan point the web is drawn down into driving relation with the roll surface. This permits the web to drive the roll and eliminates the need for elaborate driving means for the roll to maintain its linear speed the same as the speed of the web. A further and significant advantage of having a vacuum hold down portion at both sides of the air supported portion is that it isolates the scanning of the film or web from any tension variations in the web.

Sometimes when the web is fed at high speeds and the web is held onto the roll by vacuum right up to the time it approaches the scanning "bubble" the air under pressure doesn't overcome the vacuum hold down sufficiently fast and the "bubble" is not uniformly formed by the time the web passes the scanning point. To alleviate this problem one of the recesses in the stator sleeve immediately ahead of the "bubble" forming recess or recesses is connected to ambient pressure so that the hold down effect of the vacuum is dissipated before the web is subjected to air under pressure for lifting it from the roll surface.

Having outlined the purpose and function of the web guiding and supporting means constituting the present invention when used as a scanning roll, a detailed description of the structure thereof will now be given. As shown in the drawings our web guiding and supporting means is used as the scanning roll 11 shown in FIG. 1 and comprises a porous shell 11' in wrapped relation with which the web 10 to be inspected is held by two guide rolls 20'. In the preferred embodiment of the device the web 10 will be driven by means, not shown, in the direction of the arrows so that the web drives the shell, but it will be appreciated that the porous shell 11' could be driven if desired so that it will serve as a driving means for the web without going beyond the scope of the present invention. The porous shell 11' can be made from sintered metal or a sintered ceramic material both of which are commercially available with pores of any specified size from 1 to 45 mu in diameter. In the drawings the porosity of the shell has been designated by the combined use of cross hatching and stippling which would normally designate a porous metal. The porous shell guides and supports the web 10 over a given path, i.e., the angle of wrap in this case, and the shell is so disposed relative to the scanner that the web supported thereby is moved past the scanning beam at a point intermediate the ends of the angle of wrap. In other words, in the arrangement shown in FIG. 1 the web 10 is fed onto and off of the shell near the bottom thereof while the scanning position is at the top of the shell.

Referring now to FIG. 2, the porous metal shell 11' has a metal sleeve bearing liner 22 fixed within each end which form the bearing surface for air bearings mounted on the opposite ends of a stator sleeve 23 which in turn has a drive fit on a stator core 24 fixed at one end by bolts 25 to a supporting bracket 26, which in turn can be fastened by bolts 27 to a machine frame indicated at F. Each end of the stator sleeve 23 is provided with a circumferential groove 28 in covering relation with which a ring 29 of porous material is held by bolts 30 passing through flanges 31 on the ring and into a radial flange 32 in the sleeve. The stator core 24 is provided with a bore 33 extending substantially the full length thereof and having a nipple, not shown, to which a high pressure air line, not shown, may be connected. Each circumferential groove 28 is connected with the bore 33 by a radial inlet 35. When high pressure air is continuously fed into bore 33 it passes into each of grooves 28 and is then uniformly distributed as it passes through the porous bearing rings 29 to form a cushion of air in the clearance space between the stationary bearing rings 29 and the metal sleeve bearing liners 22 fixed to the shell. This cushion of air provides a frictionless air bearing between the porous shell 11' and the stator sleeve 23 so that the shell can be easily driven by the moving web wrapped therearound.

The stator sleeve 23 has a plurality (24 being shown) of longitudinal grooves 40 machined in its outside surface and spaced from one another circumferentially of the sleeve. As shown in FIGS. 3–5, each of these grooves underlies the porous shell and in combination therewith forms three low pressure chambers designated P, see FIG. 5, which are directly under the scanning point, two ambient pressure chambers designated A, see FIG. 4, one on either side of the pressure chambers P, and a group of vacuum chambers V, shown in FIG. 3 as six, three in front of and three behind the ambient pressure chambers A considered in the direction of movement of the web, or clockwise looking at FIGS. 3–5. Each of these chambers is substantially as long as the web 10 is wide, see FIG. 2, so that substantially the entire width of the web is effected in succession by vacuum, ambient pressure or low pressure air and vacuum as the web moves about the stator sleeve as the porous shell rotates therearound.

We will now describe how each of the chambers P, A and V are selectively connected to a source of low pressure air, the atmosphere or ambient pressure, and a source of vacuum, respectively. The stator core 24 has three bores extending longitudinally thereof in quadrant relation to one another and lining up with ports in the supporting bracket 26 to which nipples 50 may be attached, as illustrated on one bore in FIG. 2. One of these bores is adapted to be connected with a source of low pressure air and is designated $B_p$, another is connected with a source of vacuum and is designated $B_v$ while the third is connected to the atmosphere and is designated $B_a$. The periphery of the stator core 24 is provided with a plurality (here shown as ten) of circumferential grooves designated $G_p$, $G_v$ and $G_a$ spaced longitudinally therealong. Looking at FIGS. 2 and 3 it will be seen that the first, fourth, seventh and tenth grooves are connected to the vacuum bore $B_v$ by radial inlets $I_v$ showing that vacuum is applied thereto, and hence the use of the subscript $v$ on the designations $G_v$ and $I_v$. From FIG. 4 it will be seen that starting at the left of FIG. 2, the second, fifth and eighth grooves $G_a$ are connected by inlets $I_a$ to the bore $B_a$, or to the atmosphere which is designated by a fine stippling in FIG. 4. The remainder of the grooves $G_p$ are connected by inlets $I_p$ to the bore $B_p$ or to the low pressure air supply. Each of the grooves $G_a$, $G_p$ and $G_v$ are connected to each of the longitudinal chambers P, A and V in the periphery of the stator sleeve by radial ports 51. These ports 51 are threaded to receive set screws 52 so that they can be selectively closed or opened as conditions dictate and to provide a convenient means of shifting the porting if so desired.

Looking now at FIGS. 2 and 5, it will be seen that the chambers at the top of the stator sleeve 23 adjacent the scanning point have the set screws removed from the ports 51 which line up with the grooves $G_p$ so that air under pressure is admitted to these chambers, hence the designation $p$ used therefor. As shown by the small arrows in FIGS. 2 and 5 air under pressure enters chambers P and passes through the porous shell 11' as it moves past this portion of its path including the scanning point to force the web 10 away from the surface of the shell and form a "bubble" 100 where the web is air supported. Accordingly, as the web 10 is being scanned it is free from physical contact with the scanning shell or roll so that any foreign matter which might be captured between the shell surface and the web, or any defect in the shell surface, will not deform the web so that the scanner will indicate such a deformation as a defect. By the same token since the web is not held tight to the shell surface while being scanned, any crease or wrinkle which might be inherent in the web is free to appear and be properly detected as a flaw. For purposes of illustration we have shown this "bubble" exaggerated in size whereas actually it may be spaced from the shell surface by only a few thousandths of an inch.

As shown in FIG. 3, the set screws 52 are removed from the radial ports 51 connecting three successive chambers V ahead of the scanning point and beyond the scanning point considered in the direction of movement of the web, with the grooves $G_v$. This means that vacuum will be applied to these chambers $G_v$ as indicated by the small directional arrows, and by virtue of the porosity of the shell 11' will draw the web 10 into driving contact with the shell periphery over these portions of the web path. Accordingly, the web will serve to drive the shell 11' and thereby overcome all problems involved in trying to keep the web and periphery of the shell or scanning roll moving at the same linear speed. While we prefer to have the shell 11' driven by the web it will be appreciated that this vacuum hold down between the web and shell would allow the shell to be driven and in turn drive the web past the scanning point should it be found advantageous to do so.

While at certain web speeds it is perfectly satisfactory to have the web held onto the periphery of the shell 11' right up to the point where air under pressure is applied to force the web away from the surface of the shell and form the "bubble" at the scanning point, under certain high speed operation it has been found desirable to dissipate the hold down action of the vacuum before the web actually reaches the point where it is blown away from the shell surface in order to obtain a uniform bubble. To this end, as shown in FIG. 4, a chamber A is provided in the stator sleeve between the chambers P and the chambers V both ahead of and beyond the scanning point. The two chambers A have the set screws 52 which align with the grooves $G_a$ removed from the ports 51 so that these chambers will be opened to the atmosphere. Accordingly, before the web passes from the vacuum hold down area defined by the chambers $G_v$ into the bubble, or passes from the bubble into the trailing vacuum hold down area, it passes over a chamber $G_a$ which is open to the atmosphere and where any hold down action of the vacuum will be dissipated. In this way the vacuum hold down can be isolated from the bubble area to permit the formation of a uniform bubble even at high speed operation.

It will be appreciated that under all scanning speeds, particularly slow speeds, this exhaust to atmosphere may not be required between the vacuum hold down sections and the bubble forming section. Accordingly, the present invention is not limited to the use of such an atmosphere exhaust system.

While we have shown the stator sleeve provided with twenty-four (24) longitudinal recesses or chambers 40 and ports 51 even though only eleven (11) are actually used in the embodiment disclosed and are designated P, A or V depending upon their purpose, these extra chambers and ports are provided so that the lengths of the vacuum hold down areas, the bubble forming areas and the exhaust areas can be selectively adjusted in extent if it is found necessary or desirable. By merely inserting or removing the set screws 52 any number of successive chambers 40 can be connected to vacuum, air under pressure or atmosphere as operating conditions might dictate.

Looking at FIG. 2 it will be appreciated that some air will be exhausted from the air bearings of the porous shell 11' and will pass between the metal sleeve bearing liners 22 and the periphery of the stator sleeve in the direction of the chambers P, A and V in the periphery of the stator. So that this exhausting air will not pass into these chambers and upset the pressure conditions desired therein, particularly the vacuum chambers V and the chambers A which should be held at ambient pressure, a circumferential groove 60 is provided in the periphery of the stator sleeve 23 at the inner end of each sleeve or between the air bearings and the extreme ends of the chambers P, A and V. These circumferential grooves are connected to the atmosphere or a slight vacuum by suitable means, not shown, so that they will provide an exhaust for any air leaking from the inner ends of the air bearings and thus prevent this exhaust air from entering the chambers P, V or A.

From the above description it will be understood that the present invention provides a web guiding and supporting means which is adapted to guide and support a web while moving over a given path in such a way that during an initial portion of said path the web is held onto the guide surface by a vacuum, over an intermediate portion of the path it is lifted from the guide surface and supported on a cushion of air, and finally the web is again held onto the guide surface by a vacuum. While the web guiding and supporting means finds particular application in a web scanning device where it is desirable to isolate the web from physical contact with the guide surface during the scanning operation, it would be equally useful in any web handling device wherein some operation which is to be performed on the moving web requires that the web be momentarily removed from physical contact with its guiding and/or driving member and/or have a portion of the web isolated from tension variations in the web. While we have shown this web guiding and supporting means in the form of a roll or shell, it will be appreciated that the porous surface could be in the form of a planar support across which one reach of the belt would be moved while guiding and supporting a web as it moved over a straight path.

Although we have shown and described certain specific embodiments of our invention, we are fully aware that many modifications thereof are possible. Our invention, therefore, is not to be restricted excepting so far as is necessitated by the scope of the appended claims.

Having thus disclosed our invention, what we claim as new and novel and desired to secure by Letters Patent of the United States is:

1. A web guiding and supporting means comprising a stator core; a perforate shell embracing and rotatably mounted on said stator core and around a portion of the outer periphery of which a moving web is adapted to be wrapped; the periphery of said stator core provided with a plurality of recesses extending longitudinally of said core by an amount substantially equal to the width of said web and spaced circumferentially of that portion of the core concentric with the portion of the shell engaged by said web, a first of said recesses substantially intermediate the angle of wrap of said web in combination with the inside surface of said shell forming a pressure chamber, and one of said recesses on each side of said first recess in combination with the inside of said shell forming vacuum chambers, and means for continuously introducing air under pressure greater than the ambient pressure into said pressure chamber to force the web from the surface of said shell as it moves over said pressure chamber, and means for continuously evacuating said vacuum chambers to draw the web into surface contact and driving relation with said shell on both sides of said pressure chamber.

2. A web guiding and supporting means according to claim 1 in which said two last mentioned means include a first group of circumferential grooves and spaced axially of the periphery of said stator core and communicating with said high pressure chamber at points spaced axially thereof, a bore extending axially of said core and communicating with each of said circumferential grooves and into which air under pressure is adapted to be fed, a second group of circumferential grooves in and spaced axially of the periphery of said stator core communicating with said vacuum chambers at points spaced axially thereof, and a second bore extending axially of said core and communicating with each of said second group of circumferential grooves to which a vacuum may be applied.

3. A web guiding and supporting means according to claim 1 in which the recess immediately in advance of said pressure chamber and between it and said vacuum chamber in combination with the inside surface of said shell forms an ambient pressure chamber, and means for connecting said ambient pressure chamber to the ambient pressure whereby the hold down effect of the vacuum chamber is dissipated before the web reaches said pressure chamber where it is forced away from the shell surface.

4. A web guiding and supporting means for guiding a continuously moving web flatwise past a scanning point at which the exposed surface of the web is optically scanned for imperfections and comprising a stator core; air bearings at opposite ends of said stator core; a porous shell closely encircling said stator core and having impervious bearing sleeves at opposite ends cooperating with said air bearings for rotatably supporting said shell on said stator core; means for directing and holding said moving web in wrapped relation with said shell so that said moving web drives said shell which in turn guides the exposed surface of the web past said scanning point; the periphery of said stator core provided with a plurality of recesses extending longitudinally of said core by an amount substantially equal to the width of said web and spaced circumferentially of that portion of the core concentric with the portion of the shell engaged by said web; a first one of said recesses substantially in radial alignment with said scanning point in combination with the inside of said shell forming a pressure chamber, one of said recesses on each side of said first recess in combination with the inside of said shell forming vacuum chambers; means for continuously introducing air under pressure greater than the ambient pressure into said pressure chamber to force and hold the web out of contact with said shell as it moves past said scanning point; means for continuously evacuating said vacuum chambers to draw the web into surface contact and driving relation with said shell on both sides of said pressure chamber; and means for isolating said air bearings from said two vacuum chambers so that any air leakage or exhaust from said air bearings will not enter said vacuum chambers.

5. A web guiding and supporting means comprising a movable endless perforate guiding member having a surface for engaging the face of a moving web to guide the web over a given path, and means for selectively applying suction and gas under pressure through the perforation of that portion of said member defining said path for providing the following four zones which are isolated from one another and disposed in the order stated along the surface of the member in the direction of web movement:
 (a) a first suction zone to cause driving engagement of the web with said member during travel of the web through the zone,
 (b) an intermediate pressure zone to release the web from said engagement,
 (c) an elevated pressure zone to move the web to a position spaced from the member, and finally
 (d) a second suction zone to cause re-engagement of the web with the member.

6. In a device for inspecting one face of a flexible web for imperfections the combination with means for optically scanning said web face as it moves past a scanning point; of a movable endless guiding member the surface of which passes adjacent said scanning point and on which surface the face of said web opposite that face to be scanned is adapted to be supported and moved over a given path intermediate the ends of which said scanning point is located; means normally acting to hold said web in surface contact with said guiding member for movement therewith; and means for yieldably forcing and holding a limited length of said web out of contact with said guiding member during the time it passes said scanning point.

7. In a device for optically scanning one face of a moving flexible web for imperfections the combination with means for optically scanning said web face as it moves past a scanning point; of an idler roll the surface of which passes adjacent said scanning point; means for guiding and holding said moving web in wrapped relation with said idler roll so that said moving web drives said roll and said roll guides the exposed face of the web past said scanning point; and means for yieldably forcing and holding a limited length of said web out of contact with the surface of said roll during the time it passes said scanning point while maintaining the driving relation between said web and said roll.

8. A method of optically scanning one face of a flexible web to locate defects therein comprising, continuously engaging a moving surface with the opposite face of said web to advance said web along a path defined thereby; yieldably moving and holding a limited length of said advancing web away from engagement with said moving surface during its travel along said path; and continuously optically scanning said one face of said web while said web is disengaged from said moving surface.

References Cited in the file of this patent

UNITED STATES PATENTS

| | | |
|---|---|---|
| 2,719,235 | Emerson | Sept. 27, 1955 |
| 2,985,396 | Johnson | May 23, 1961 |
| 3,019,130 | Hornbostel | Jan. 30, 1962 |

OTHER REFERENCES

IBM Technical Disclosure Bulletin, vol. 3, No. 12, May 1961, p. 6.